United States Patent [19]

Mittendorf

[11] Patent Number: 5,704,538

[45] Date of Patent: Jan. 6, 1998

[54] METHOD FOR JOINING RHENIUM TO COLUMBIUM

[75] Inventor: Donald Lee Mittendorf, Mesa, Ariz.

[73] Assignee: AlliedSignal Inc., Morris Township, N.J.

[21] Appl. No.: 655,036

[22] Filed: May 29, 1996

[51] Int. Cl.[6] .................................................. B23K 31/02
[52] U.S. Cl. .............................. 228/194; 228/262.8
[58] Field of Search ............................ 228/121, 122.1, 228/194, 195, 262.8

[56] References Cited

U.S. PATENT DOCUMENTS

| | | |
|---|---|---|
| 2,861,327 | 11/1958 | Bechtold et al. . |
| 3,065,532 | 11/1962 | Sachse . |
| 3,340,025 | 9/1967 | Milch et al. . |
| 3,366,466 | 1/1968 | Milch et al. . |
| 3,386,160 | 6/1968 | Milch et al. . |
| 3,466,158 | 9/1969 | Rhys . |
| 3,584,187 | 6/1971 | Majetich . |
| 4,073,426 | 2/1978 | Devine, Jr. ............... 228/122.1 |
| 4,705,207 | 11/1987 | Norris . |
| 4,706,872 | 11/1987 | Norris . |
| 4,715,525 | 12/1987 | Norris . |
| 5,110,035 | 5/1992 | Reynolds, Jr. et al. . |
| 5,209,388 | 5/1993 | Mittendorf et al. . |

*Primary Examiner*—Samuel M. Heinrich
*Attorney, Agent, or Firm*—Jerry J. Holden

[57] ABSTRACT

A method for joining rhenium to columbium and columbium based alloys that minimizes the formation of brittle intermetallics. First, a layer of ruthenium is applied to both the rhenium and columbium and then heated until the ruthenium diffuses with the rhenium and columbium respectively. A braze foil is place between the two outer ruthenium layers and the assembly is heated in a range of 50° C. to 100° C. above the liquidus of the braze, thereby joining the rhenium to the columbium. Alternatively, the ruthenium coated surfaces are placed in contact and diffused together under a compressive load of at least 1000 psi.

14 Claims, 1 Drawing Sheet

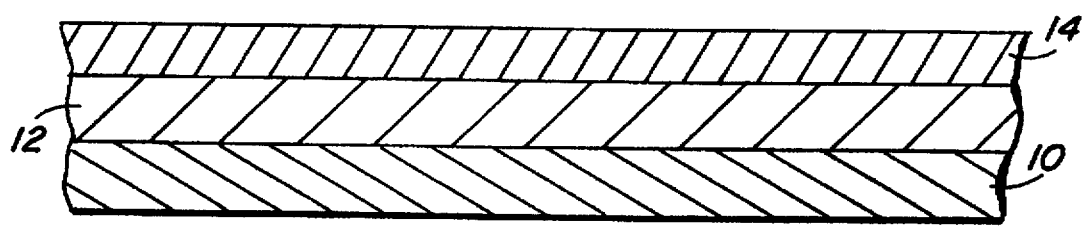

METHOD FOR JOINING RHENIUM TO COLUMBIUM

TECHNICAL FIELD

This invention relates generally to bonding processes and in particular to a process for bonding rhenium to columbium and columbium based alloys.

BACKGROUND OF THE INVENTION

Currently, mono-propellant and bi-propellant radiation cooled rockets use nozzles and thrust chambers made of a columbium alloy, ($Cb_{103}$), covered with a fused silica coating for oxidation protection. These nozzles and thrust chambers generally can withstand temperatures as high as 2400° F. To increase the operating temperatures of these rockets, it has been proposed to combine the columbium nozzles with rhenium thrust chambers. When conventional joining methods, such as welding and brazing, are used to join rhenium to columbium, brittle intermetallics form. An intermetallic is a compound formed when two metals ionically bond. Because of the brittleness of the intermetallic, cracks can form and lead to the failure of the joint between the rhenium and columbium.

Accordingly there is a need for a method of joining rhenium to columbium that minimizes the formation of intermetallics.

SUMMARY OF THE INVENTION

An object of the present invention is to provide a method of joining rhenium to columbium that minimizes the formation of intermetallics.

The present invention achieves this object by providing a method for joining rhenium to columbium that uses an intermediate layer of ruthenium which has a limited intermetallic formation characteristic. The ruthenium is coated onto both the rhenium and columbium and then exposed to high temperature to diffuse the ruthenium with the rhenium and columbium respectively. A braze foil is then placed between the two ruthenium outer layers and the assembly is heated in a range of 50° C. to 100° C. above the liquidus of the braze, thereby joining the rhenium to the columbium. Alternatively, the two ruthenium layers can be diffused together during the same thermal cycle in which the ruthenium is diffused with the rhenium and columbium.

BRIEF DESCRIPTION OF THE DRAWING

The sole FIGURE is a cross-sectional view of an article formed by a method contemplated by the present invention.

DESCRIPTION OF THE PREFERRED EMBODIMENT

A method for bonding rhenium to columbium includes the following steps. An article either made of, or having a portion of, or a coating of pure rhenium is to be bonded to an article either made of, or having a portion of, or a coating of pure columbium or alloys thereof. The alloy is preferably at least 95% columbium composition. An example of such an alloy is $Cb_{103}$.

The rhenium is cleaned in a nonpolar solvent and then immersed into a solution of water and nitric acid so as to slightly etch the surface of the rhenium. This step also removes oxides from the surface. After cleaning, a layer of pure ruthenium is electroplated to the rhenium. The thickness of the ruthenium is preferably between 0.001 inches to 0.003 inches. The ruthenium is then diffused into the rhenium by heating in a vacuum (pressure less than or equal to $5\times10^{-5}$ torr), to a temperature between 1200° C. and 1900° C. for 1 to 4 hours (1800° C. for 1 hour is preferred) to obtain a mixed layer of ruthenium/rhenium which is typically 0.0007 inch thick. This layer provides a solid solution metallurgical interface which has a coefficient of thermal expansion between that of the rhenium and the ruthenium and is ductile in character allowing for deformation due to mismatch conditions which may exist during the brazing steps to follow.

The columbium is cleaned in a nonpolar solvent, and after cleaning, a layer of pure ruthenium is electroplated to the columbium. The thickness of the ruthenium is preferably between 0.001 inches to 0.003 inches. The ruthenium is then diffused into the columbium by heating in a vacuum, (pressure less than or equal to $5\times10^{-5}$ torr), to a temperature between 1560° C. and 1850° C. for 1 to 4 hours (1800° C. for 1 hour is preferred) to obtain a layer of mixed columbium/ruthenium typically 0.0005 inch thick. This layer provides a solid solution mixture which is ductile in character and allows for deformation of mismatch conditions which may exist during the braze steps that follow. This layer has a coefficient of thermal expansion between that of columbium and ruthenium.

Alternatively, for both rhenium and columbium the ruthenium can be applied by wet application of an alcohol dissolved ruthenium salt.

The columbium and rhenium are assembled with a braze foil in contact with their respective ruthenium electroplated surfaces to form a braze interface. The braze foil should have a thickness between 0.002 and 0.005 inch, and can be any gold-nickel, gold-palladium-nickel, BAu-5 or any nickel-palladium combination. A compressive load in the range of 50 psi to 200 psi is then applied to the braze interface. In a manner familiar to those skilled in the art, the compressive load can be applied by various methods such as interference fit, external load, and/or thermal expansion difference fixture. The latter is a fixture that thermally expands less than the part to be brazed resulting in a net compressive force on the part when heated. Applying the compressive load is not essential to obtain the proper metallurgical bond but does minimize porosity and mechanical defects in the braze interface.

While maintaining the compressive load, the assembly is placed in a vacuum (pressure less than or equal to $1\times10^{-5}$ torr) and heated to a temperature that is 50° C. to 100° C. above the liquidus of the braze alloy selected. This temperature should be held constant for between five to twenty minutes. The assembly is then cooled and the compressive load released.

In an alternative method, after the ruthenium has been electroplated onto the rhenium and columbium, the ruthenium coated surfaces are placed in contact and a compressive load of at least 1000 psi is applied and the assembly is heated in a vacuum (pressure less than or equal to $5\times10^{-5}$ torr), to a temperature between 1750° C. and 1900° C. for at least one hour. The assembly is then cooled to ambient temperature and the compressive load removed. This process results in diffusion bonding of the ruthenium layers.

Referring to sole figure, with either process an article is formed comprising a layer of rhenium 10, a layer of columbium or a columbium based alloy 14, and a ruthenium bond layer 12 disposed between the layers 10 and 14. Importantly, the bond layer 12 is of a material that is different than the material of the layers 10 and 14. When the braze process described herein is used, the resulting bond layer 12 is comprised of a ductile layer of mixed rhenium-ruthenium, braze alloy-ruthenium and a ductile mixed layer of ruthenium-columbium. When the alternate diffusion process is used the resulting bond layer 12 is comprised of a ductile layer of mixed rhenium-ruthenium, a pure layer of ruthenium, and a ductile mixed layer of ruthenium-columbium. With either process, the joining of rhenium to a columbium is accomplished in a manner that minimizes the formation of brittle intermetallics.

Various modifications and alterations to the above described preferred embodiment will be apparent to those skilled in the art. Accordingly, this description of the invention should be considered exemplary and not as limiting the scope and spirit of the invention as set forth in the following claims.

What is claimed is:

1. A method for joining rhenium to columbium and columbium based alloys, comprising the following steps:
   (a) providing a first article having at least a portion of rhenium;
   (b) providing a second article having at least a portion taken from the group consisting of columbium and columbium based alloys;
   (c) applying a first layer of ruthenium to said rhenium portion;
   (d) applying a second layer of ruthenium to said columbium portion;
   (e) heating said ruthenium layered rhenium portion to form a mixed layer of ruthenium and rhenium therebetween;
   (f) heating said ruthenium layered columbium portion to form a mixed layer of ruthenium and columbium therebetween;
   (g) providing a braze foil;
   (h) placing said ruthenium layered rhenium portion and said ruthenium layered columbium portion in contact with opposite sides of said braze foil;
   (i) heating the assembly of the previous step to a temperature above the liquidus of said braze; and
   (j) cooling the assembly of step (i) to ambient temperature.

2. The method of claim 1 wherein each of said steps of applying a layer of ruthenium is electroplating.

3. The method of claim 1 wherein each of said ruthenium layers is between 0.001 inches to 0.003 inches thick.

4. The method of claim 1 further including the step of holding the temperature in step (i) constant for 5 to 20 minutes.

5. The method of claim 4 wherein step (e) is at a temperature range between 1200° C. and 1900° C. for a period of 1 to 4 hours.

6. The method of claim 5 wherein step (f) is at a temperature range between 1560° C. and 1770° C. for 1 to 4 hours.

7. The method of claim 6 wherein the heating in steps (e), (f), and (i) occur in a vacuum.

8. The method of claim 6 further including after step (b) the step of cleaning said rhenium and columbium portions in a nonpolar solvent.

9. The method of claim 1 further including after step (h) the step of applying a compressive load to the assembly of step (h).

10. The method of claim 9 wherein said compressive load is in the range of 50 psi to 200 psi.

11. A method for joining rhenium to columbium and columbium based alloys, comprising the following steps:
    (a) providing a first article having at least a portion of rhenium;
    (b) providing a second article having at least a portion taken from the group consisting of columbium and columbium based alloys;
    (c) applying a first layer of ruthenium to said rhenium portion;
    (d) applying a second layer of ruthenium to said columbium portion;
    (e) placing said first ruthenium layer in contact with said second ruthenium layer and applying a compressive load thereto;
    (f) heating the assembly of step (e) until said rhenium diffuses with said first ruthenium layer, said first ruthenium layer diffuses with said second ruthenium layer, and said second ruthenium layer diffuses with said columbium; and
    (g) releasing said compressive load and cooling said assembly to ambient temperature.

12. The method of claim 11 wherein step (f) is at a temperature in the range of 1750° C. to 1900° C. for at least one hour.

13. The method of claim 12 wherein the compressive load of step (e) is at least 1000 psi.

14. A method for joining rhenium to columbium and columbium based alloys, comprising the following steps:
    (a) providing a first article having at least a portion of rhenium;
    (b) providing a second article having at least a portion taken from the group consisting of columbium and columbium based alloys;
    (c) applying a first layer of ruthenium to said rhenium portion;
    (d) applying a second layer of ruthenium to said columbium portion; and
    (e) bonding said first layer of ruthenium to said second layer of ruthenium.

* * * * *